Figure 1:
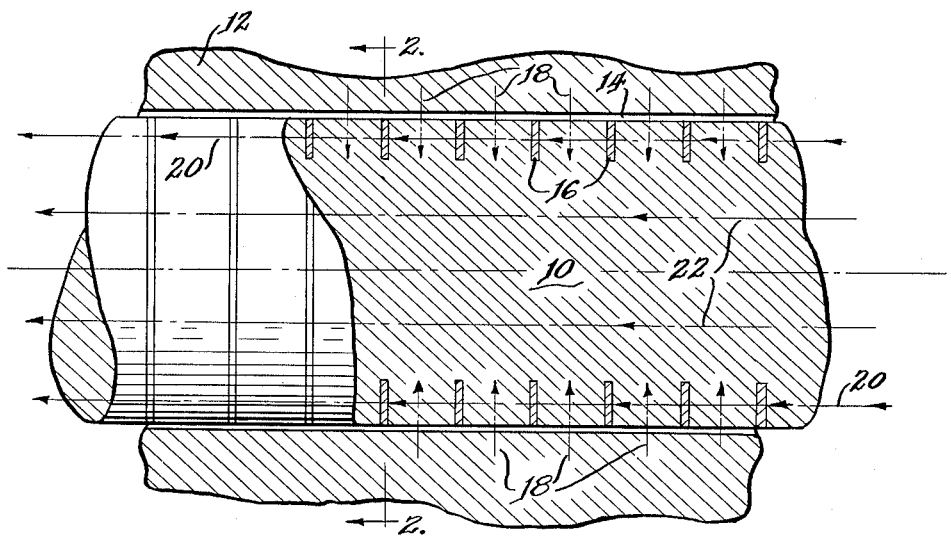

Nov. 9, 1965     E. E. MUSSET     3,217,199

HOMOPOLAR GENERATOR

Filed June 8, 1962

INVENTOR.
Edmond E. Musset
BY
Attorney 3,217,199
HOMOPOLAR GENERATOR
Edmond E. Musset, Chicago, Ill., assignor to the United States of America as represented by the United States Atomic Energy Commission
Filed June 8, 1962, Ser. No. 201,220
8 Claims. (Cl. 310—178)

This invention relates generally to homopolar (unipolar) electric machinery and more specifically, to means for increasing the power capacity and efficiency of homopolar generators. The invention described herein was made in the course of, or under, a contract with the U.S. Atomic Energy Commission.

Homopolar generators are used in very high direct current applications. In general, in the prior art two types of rotors have been employed in the design of these generators. The first type is a rotor of solid iron or steel which has a high internal voltage drop when high currents are generated. To reduce this undesirable feature, a second type of rotor has been used in which copper bars are imbedded therein or a copper cylinder placed therearound to control the electric current path and reduce its electrical resistance. The second type, however, requires higher excitation power and a corresponding reduction in efficiency results. Furthermore, it has been difficult to accurately design a homopolar generator of the first type to specification requirements due to little control over the electric current and magnetic flux paths in the rotor.

It is to be understood that the aforementioned problems existing in the prior art, and the description of this invention in the specification to follow, apply equally to all types of homopolar electric machinery, motors and generators alike. However, for clarity of description in presenting this invention and since homopolar generators are presently in wider use than homopolar motors, the principles of operation of this invention will be described in terms of the application of the invention in the improvement of the design of homopolar generators.

It is, therefore, an object of this invention to provide a means of reducing the aforementioned problems in the design and operation of homopolar generators.

It is another object of this invention to provide a more efficient type of homopolar generator rotor having at load conditions a lower internal voltage drop and lower excitation power requirements than the first type discussed above, and having lower excitation power requirements at load and no-load conditions than the second type discussed above.

Other objects will become apparent as the detailed description proceeds.

A homopolar generator in its simplest form comprises a cylindrical rotor of iron or steel rotatable about its longitudinal axis and a stator containing a main pole disposed about the active part of the rotor. Excitation windings located in the stator produce a magnetic flux. The lines of the magnetic flux are directed radially into the rotor by the main pole. The novelty of the device herein disclosed consists in the imbedding of a plurality of nonmagnetic metal rings (such as copper or aluminum) into the periphery of the rotor under the main pole face and beyond (herein defined as the active portion of the rotor). These rings are placed so that each define a plane that is normal to the axis of the rotor. (The rings may not be exactly in this normal plane due to structural design and manufacturing considerations.) Therefore, near the cylindrical periphery of the rotor, a high magnetic reluctance exists longitudinally of the rotor while no additional impedance to the flow of an electric current is presented. Thus, the induction flux from the main pole is forced to remain in a radial direction as it penetrates the periphery of the rotor so as to provide maximum induction. When the circuit is completed across the generator terminals, an electric current resulting from the induced E.M.F. flows longitudinally of the rotor and may be drawn therefrom in the usual manner.

Figure 2:
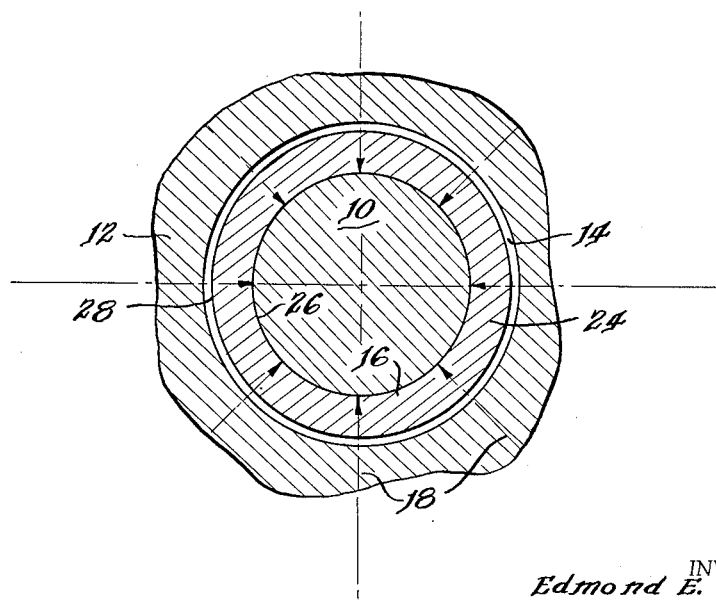

Along with the information to follow, a more complete understanding of the invention will be obtained from consideration of the accompanying drawings in simplified form, in which:

FIG. 1 is a transverse diagrammatic view of a portion of a homopolar generator rotor and its stator shown partly in elevation and partly in section; and FIG. 2 is a diagrammatic cross sectional view taken through line 2—2' in FIG. 1 and looking axially of the rotor.

Referring to FIGS. 1 and 2, a rotor 10 is shown in its environment within a portion of the main pole 12 of a stator disposed annularly therearound. A gap 14 exists between rotor and stator. A portion of the gap 14 is shown between rotor 10 and the portion of the main pole 12 of the stator. A plurality of nonmagnetic rings 16 are imbedded in the periphery of rotor 10 and axially spaced therealong. The flow of induction flux from the main pole within the stator is illustrated by the arrows 18. The electric current resulting from the induced E.M.F. is illustrated by arrows 20. Arrows 20 illustrate the path of the electric current; however, it should be understood that the direction of flow could be opposite to that shown depending on the direction of rotation of the rotor. The return path of the induction flux and its assumed direction is shown by arrows 22. The main electric current carrying cross section 24 is shown in FIG. 2. The main current carrying cross section 24 is defined by the area between the inside diameter 26 and the outside diameter 28 of rings 16.

When the rotor 10 is caused to rotate by an external power source (not shown) and the field windings are excited, the induction flux 18 enters rotor 10 and causes the induction of an E.M.F. in the current carrying cross section 24. When the circuit across the generator terminals is closed, a current 20 then flows as shown in FIG. 1. This current is drawn in the usual manner from the rotor by a collector (not shown) which may be of the liquid-metal type in order to readily handle the large currents produced.

In the prior art where the rings of this invention were not present in the rotor, the induction flux 18 had a pronounced tendency to deviate from its radial path shortly after entering the rotor. In a homopolar generator of the type shown, the maximum induced E.M.F. is obtained if the induction flux enters the rotor radially, and the machine efficiency can be controlled by varying the radial depth of the flux path. In general, the longer the radial path through the rotor, the greater the efficiency of the machine up to a limiting point inherent in the physical size of the rotor, it being necessary to leave enough cross section for flux return. The rings 16, due to the high reluctance they present to flux flow longitudinally of the rotor, force the flux to remain in a radial path throughout the entire depth of the current carrying cross section 24. Furthermore, without the rings 16, the electric current carrying cross section 24 would not be accurately defined, hence difficulty would exist in predicting the operational characteristics of the generator. It is evident that the separation of the current path 20 from the magnetic return path 22 greatly simplifies design considerations and calculations.

It is, therefore, apparent that this invention offers the following advantages over the prior art:

(1) The rings allow accurate control of the radial path length of induction flux in the rotor. The radial path length can be made any predetermined length which may be dictated by the desired power output and efficiency of the machine.

(2) Due to the possibility of any increase of the cross section of induction, the voltage drop and ohmic losses in the current path in the rotor can be reduced to a minimum.

(3) The ratio of voltage at no-load to the voltage at load, at no-load excitation, is reduced which improves the voltage regulation feature of the generator.

(4) The use of this invention results also in a minimum effective magnetic gap and an optimum rotor design for any given set of operating requirements. The excitation power under load conditions is therefore substantially reduced compared with the requirement with any design prior to this invention. The excitation power under no-load conditions is substantially reduced compared with that required in the copper sleeve or imbedded copper bar designs.

(5) Due to decreased ohmic losses of the current path in the rotor and decreased excitation losses, the efficiency of the machine is increased.

(6) Due to lower internal ohmic losses and therefore increased efficiency, the output is higher than that of other machines of comparable size.

(7) The electric current carrying cross section is clearly defined, separating the electric current carrying portion of the rotor from the magnetic return path.

(8) Due to high magnetic reluctance of the current carrying cross section, the electric current distribution remains constant even though flux displacement may change.

Due to the aforementioned advantages the following end results are obtained by practice of this invention:

(1) Increased effect of induction increases efficiency and power capacity for a homopolar generator of a given size.

(2) Voltage drop and ohmic losses in the rotor are decreased.

(3) Excitation power requirements are considerably decreased.

(4) Inherent generator voltage regulation is improved.

(5) With the same temperature rise, the power capacity of a given machine is increased.

(6) A homopolar generator of solid iron or steel rotor type may be more precisely designed to meet specified requirements of a particular application.

(7) The generator is made more adaptable to pulse operation.

Persons skilled in the art will, of course, readily adapt the general teachings of the invention to embodiments other than the specific embodiment illustrated. Accordingly, the scope of the protection afforded the invention is not intended to be limited to the particular embodiment shown in the drawings and described above, but should be determined only in accordance with the appended claims.

What is claimed is:

1. In a homopolar electric machine comprising a cylindrical rotor of magnetic material rotatable about its longitudinal axis and a stator disposed about said rotor and containing a pole capable of directing a magnetic field with lines of force radial to said rotor, the combination with said rotor of a plurality of axially spaced rings of nonmagnetic material imbedded in the cylindrical periphery of said rotor along the active portion thereof so as to be in electrical contact therewith.

2. The combination according to claim 1, wherein each of said nonmagnetic rings defines a plane substantially normal to the axis of said rotor.

3. The combination according to claim 1, wherein said nonmagnetic rings are composed of a nonmagnetic metal of high electrical conductivity.

4. In a homopolar electric machine comprising a cylindrical rotor of magnetic material having an essentially solid construction throughout the electric current and magnetic flux carrying portions thereof and rotatable about its longitudinal axis, and a stator annularly disposed about said rotor and containing a pole capable of directing a magnetic field with lines of force radial to said rotor, the combination with said rotor of a plurality of axially spaced rings of nonmagnetic material imbedded in the cylindrical periphery of said rotor along the active portion thereof so as to be in electrical contact therewith.

5. The combination according to claim 4, wherein each of said nonmagnetic rings defines a plane substantially normal to the axis of said rotor.

6. The combination according to claim 4, wherein said nonmagnetic rings are composed of a nonmagnetic metal of high electrical conductivity.

7. In a homopolar electric machine comprising a cylindrical rotor of magnetic material having essentially solid construction throughout the electric current and magnetic flux carrying portions thereof and rotatable about its longitudinal axis, said electric current carrying portion being bounded by the cylindrical periphery of said rotor and extending radially inward a distance short relative to the radius of said rotor, and a stator annularly disposed about said rotor and containing a pole capable of directing a magnetic field with lines of force radial to said rotor, the combination with said rotor of a plurality of axially spaced rings of nonmagnetic material imbedded into the cylindrical periphery of said rotor along the active portion thereof so as to be in electrical contact therewith, each of said rings defining a plane substantially parallel with said radial lines of magnetic flux, the outer diameter of said rings being approximately equal to the diameter of said rotor and the inner diameter of said rings being of a value such as to define an optimum electric current carrying cross section of said rotor between said inner and outer ring diameters depending on the voltage-current requirements of the machines.

8. The combination according to claim 7, wherein said nonmagnetic rings are composed of a nonmagnetic metal of high electrical conductivity.

References Cited by the Examiner

UNITED STATES PATENTS

| 1,912,167 | 5/33 | Anderson | 310—211 X |
| 2,230,131 | 1/41 | Chandeysson | 310—178 |
| 2,345,835 | 4/44 | Serduke | 310—178 X |
| 3,045,135 | 6/62 | Honsinger | 310—211 X |

FOREIGN PATENTS

| 506,775 | 6/20 | France. |
| 934,899 | 11/55 | Germany. |

OTHER REFERENCES

"Westinghouse Engineer," vol. 16, No. 2, March 1956, page 59.

ORIS L. RADER, *Primary Examiner.*

MILTON O. HIRSHFIELD, *Examiner.*